United States Patent
Yim et al.

(10) Patent No.: US 8,147,374 B2
(45) Date of Patent: Apr. 3, 2012

(54) METHOD OF CONTROLLING HYBRID VEHICLE

(75) Inventors: Dokyung Yim, Seocho-gu (KR); Joungchul Kim, Suwon (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 318 days.

(21) Appl. No.: 12/621,116

(22) Filed: Nov. 18, 2009

(65) Prior Publication Data

US 2010/0137097 A1   Jun. 3, 2010

(30) Foreign Application Priority Data

Dec. 2, 2008   (KR) ................ 10-2008-0121359

(51) Int. Cl.
*B60W 10/08* (2006.01)
(52) U.S. Cl. .......................................................... 477/4
(58) Field of Classification Search ............. 180/65.285; 477/4
See application file for complete search history.

(56) References Cited

U.S. PATENT DOCUMENTS

| | | | |
|---|---|---|---|
| 6,595,895 B2* | 7/2003 | Suzuki et al. | 477/3 |
| 7,100,719 B2* | 9/2006 | Yamaguchi | 180/65.1 |
| 7,217,221 B2* | 5/2007 | Sah et al. | 477/3 |
| 7,976,427 B2* | 7/2011 | Yamamoto et al. | 477/4 |
| 8,016,717 B2* | 9/2011 | Ebner et al. | 477/3 |

FOREIGN PATENT DOCUMENTS

| | | |
|---|---|---|
| JP | 2008-114802 A | 5/2008 |
| KR | 10-2003-0030537 A | 4/2003 |

\* cited by examiner

*Primary Examiner* — Dirk Wright
(74) *Attorney, Agent, or Firm* — Edwards Wildman Palmer LLP; Peter F. Corless

(57) ABSTRACT

A method of controlling a hybrid vehicle including an automatic transmission and a motor generator comprises a pre-gearshift control, a mid-gearshift control, and a post-gearshift control. It is possible to prevent abnormal operations and damage of an automatic transmission due to reverse rotation of the input shaft of the automatic transmission and achieve smooth and stable pre-stop gearshift, by appropriately controlling reverse torque exerted in the input shaft of the automatic transmission, when a vehicle equipped with a hybrid driving apparatus including the automatic transmission performs the pre-stop gearshift.

9 Claims, 2 Drawing Sheets

METHOD OF CONTROLLING HYBRID VEHICLE

CROSS-REFERENCE TO RELATED APPLICATIONS

The present application is based on, and claims priority from, Korean Application Serial Number 10-2008-0121359, filed on Dec. 2, 2008, the disclosure of which is hereby incorporated by reference herein in its entirety.

TECHNICAL FIELD

The present disclosure relates to a method of controlling a hybrid vehicle, particularly a technology about a method of controlling a motor generator in regenerative braking.

BACKGROUND ART

A hybrid vehicle has a regenerative braking function that provides not only braking force but electricity to charge a battery by generating a predetermined amount of reverse torque in a motor generator in braking.

On the other hand, in a vehicle equipped with an automatic transmission, as the vehicle speed decreases, gearshift is performed from the present N-state to an N−1-state.

Accordingly, in a vehicle equipped with a hybrid driving apparatus including an automatic transmission, in a pre-stop state in which a driver releases the acceleration pedal and presses down the brake pedal for deceleration, a considerable amount of reverse torque is exerted in the input shaft of the automatic transmission for generative braking and pre-stop gearshift (i.e., N to N−1 shift).

However, when the pre-stop gearshift is performed with the considerable amount of reverse torque exerted in the input shaft of the automatic transmission as described above, the input shaft may reverse while the clutch inside the automatic transmission slides.

In the above case, it is difficult to control the desired gearshift and a desired driveablity cannot be ensured. Further, the oil pump in the automatic transmission may be reversely operated, such that it does not supply oil into the automatic transmission, but pumps the oil out of the automatic transmission. Therefore, friction members in the automatic transmission may be damaged and the automatic transmission may even fail or be broken.

The above information disclosed in this Background Art section is only for enhancement of understanding of the background of the invention and therefore it may contain information that does not form the prior art that is already known in this country to a person of ordinary skill in the art.

SUMMARY

Embodiments of the present invention provide a method of controlling a hybrid vehicle that makes it possible to prevent abnormal operations and damage of an automatic transmission due to reverse rotation of the input shaft of the automatic transmission and achieve smooth and stable pre-stop gearshift, by appropriately controlling reverse torque exerted in the input shaft of the automatic transmission, when a vehicle equipped with a hybrid driving apparatus including the automatic transmission performs the pre-stop gearshift.

A method of controlling a hybrid vehicle according to the present invention includes a step of pre-gearshift control that reduces reverse torque of a motor generator to the level of a first step, when a pre-stop gearshift order is generated in regenerative braking, between a point of time where the gearshift order is generated and a point of time where the actual gearshift is started, a step of mid-gearshift control that reduces the reverse torque of the motor generator to the level of a second step, which is smaller than the level of the first step, from a point of time where the actual gearshift starts to be performed by the gearshift order to a point of time where engaging components of an automatic transmission are completely interlocked, and a step of post-gearshift control that increases the reverse torque of the motor generator after the interlocking is finished.

The method may be configured such that the step of pre-gearshift control linearly reduces the reverse torque of the motor generator to the level of the first step, and then maintains the reverse torque of the motor generator that has been reduced to the level of the first step before the step of mid-gearshift control.

The method may be configured such that the step of post-gearshift control relatively gently increases the inclination of increase in the reverse torque of the motor generator in the earlier state, and the relatively steeply increases the inclination after engaging force for engaging components of an automatic transmission is completely created.

Further, a method of controlling a hybrid vehicle according to the present invention includes: a step of engine stop that stops engine when a driver releases an acceleration pedal; a step of regenerative braking that makes a brake and a motor generator separately provide desired braking force is performed when the driver presses down a brake pedal after the step of engine stop; a step of pre-gearshift control that reduces reverse torque of a motor generator to the level of a first step, when a pre-stop gearshift order is generated during the step of regenerative braking; a step of mid-gearshift control that reduces the reverse torque of the motor generator to the lever of a second step smaller than the level of the first step, after the step of pre-gearshift control; a step of post-gearshift control that increases the reverse torque of the motor generator after the step of mid-gearshift control.

The present invention makes it possible to prevent abnormal operations and damage of an automatic transmission due to reverse rotation of the input shaft of the automatic transmission and achieve smooth and stable pre-stop gearshift, by appropriately controlling reverse torque exerted in the input shaft of the automatic transmission, when a vehicle equipped with a hybrid driving apparatus including the automatic transmission performs the pre-stop gearshift.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

For better understanding of the nature and objects of the present invention, reference should be made to the following detailed description with the accompanying drawings, in which.

DETAILED DESCRIPTION OF EMBODIMENTS

Figure 1:
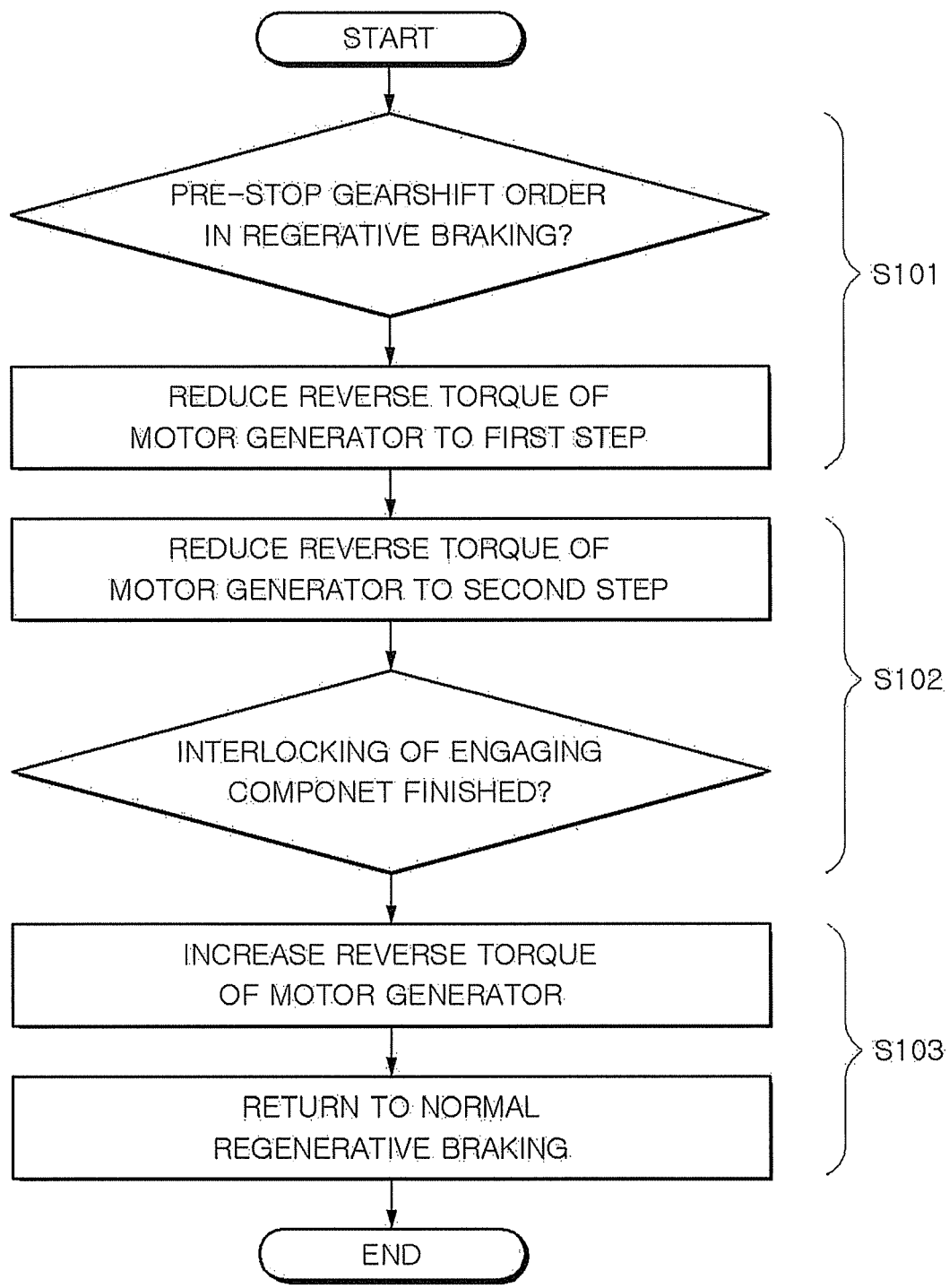
FIG. 1 is a flowchart illustrating a method of controlling a hybrid vehicle according to an embodiment of the present invention.
Figure 2:
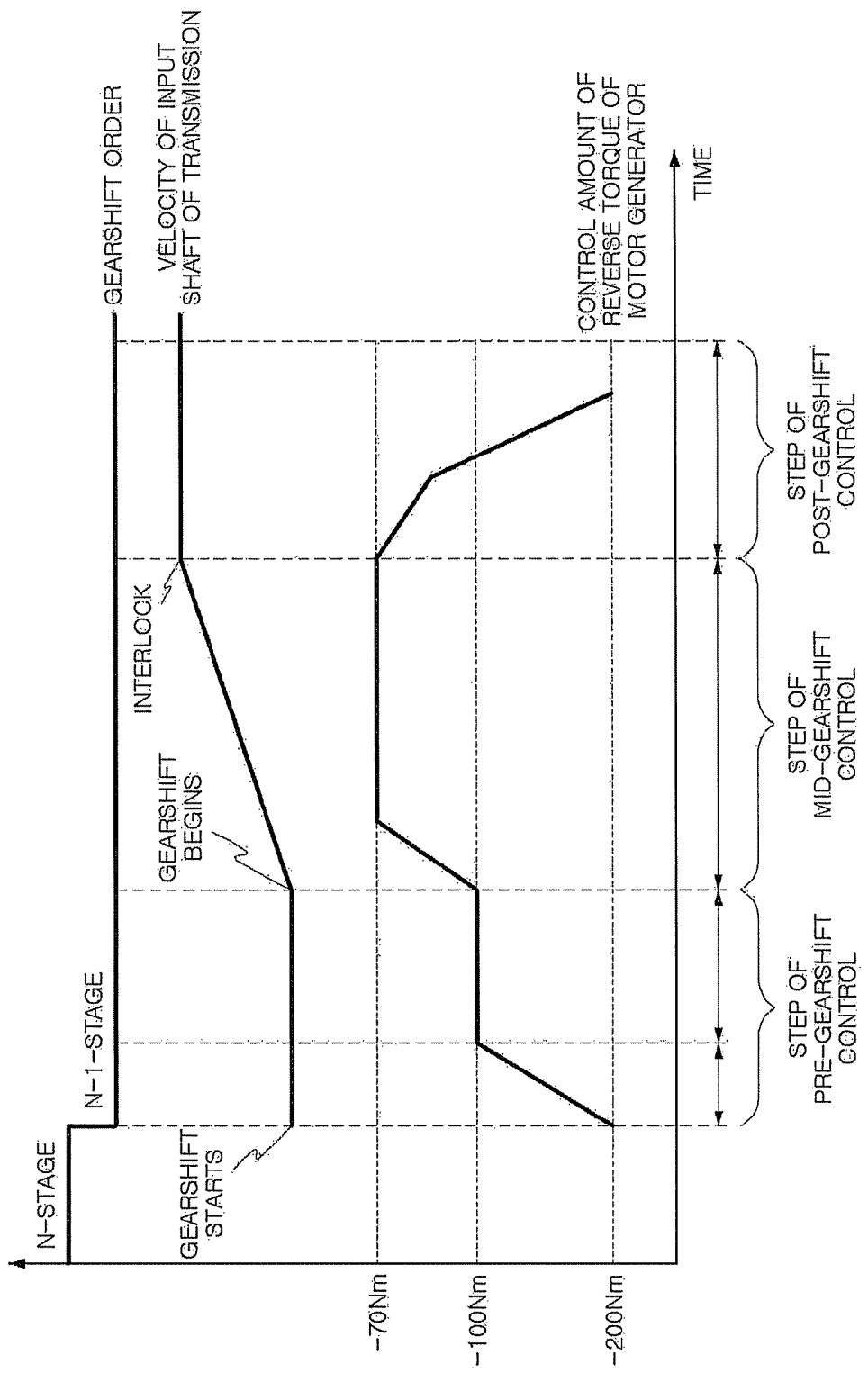
FIG. 2 is a graph illustrating the method of controlling a hybrid vehicle according to the embodiment of the present invention.

Referring to FIGS. 1 and 2, a method of controlling a hybrid vehicle including an automatic transmission and a motor generator according to an embodiment of the present invention includes a pre-gearshift control, a mid-gearshift control, and a post-gearshift control. In the pre-gearshift control, reverse torque of the motor generator is controlled to be reduced to the level of a first step, when a pre-stop gearshift order is generated in regenerative braking, between a point of time where the gearshift order is generated and a point of time where the actual gearshift is started. In the mid-gearshift control, the reverse torque of the motor generator is controlled to be reduced to the level of a second step, which is smaller than the level of the first step, from a point of time where the actual gearshift starts to be performed by the gearshift order to a point of time where engaging components of the automatic transmission are completely interlocked. In the post-gearshift control, the reverse torque of the motor generator is controlled to be increased after the interlocking is finished.

When the gearshift order is generated according to changes in speed of the vehicle in regenerative braking, gearshift is performed by one releasing component and one engaging component in the automatic transmission.

In the pre-gearshift control, a predetermined amount of hydraulic pressure is exerted in the releasing component, such that it is possible to reduce the reverse torque of the motor generator to the lever of the first step that is lower than the second step of the mid-gearshift control.

The pre-gearshift control includes two steps. The reverse torque of the motor generator is first gradually reduced linearly to the level of the first step (e.g., −100 Nm in FIG. 2) in consideration of the response of the brake because it is required to involve the brake in the braking force that has been involved in the motor generator without a change in regenerative braking, and then the reverse torque of the motor generator that has been reduced to the level of the first step is maintained before the mid-gearshift control.

Thereafter, the mid-gearshift control is performed, in which the releasing component is substantially released and the engaging element is substantially engaged, thereby performing gearshift. Accordingly, since it is required to maximally reduce to the reverse torque of the motor generator, the reverse torque is reduced to the level of the second step (e.g., −70 Nm in FIG. 2) such that excessive reverse torque is not applied to the input shaft of the automatic transmission and smooth and stable gearshift is achieved.

In the present embodiment, as shown in FIG. 2, the reverse torque of the motor generator is linearly reduced from the level of the first step to the level or the second step, and then the reverse torque reduced to the level of the second step is maintained before the step of post-gearshift control.

Lack of the braking force created by reducing the reverse torque of the motor generator that is in regenerative braking operation is supplemented by braking force of the brake.

The levels of the first step and the second step where the reverse torque of the motor generator is reduced are values that may be selected by experiments and analysis according to the hybrid driving apparatus.

In the post-gearshift control, the inclination of increase in the reverse torque of the motor generator is made relatively gentle in the earlier state and the inclination is made relatively steep after engaging force for the engaging components of the automatic transmission is completely created.

That is, as shown in FIG. 2, the reverse torque of the motor generator is gently increased from a time point when the engaging components are completely interlocked to a time point when the engaging force for the engaging components is completely created, and then when it is determined that the engaging force for the engaging components is completely created and gearshift is finished, the reverse torque of the motor generator is rapidly increases, such that the motor generator rapidly returns to the initial regenerative braking state before the gearshift order is generated.

As described above, according to the present invention, when a pre-stop gearshift order is generated in regenerative braking, the reverse torque of the motor generator is appropriately reduced correspondingly, such that it is possible to prevent an abnormal operation, in which the input shaft of the automatic transmission reverses, and achieve smooth and stable gearshift.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling a hybrid vehicle including an auto transmission and a motor generator, comprising:
    a step of pre-gearshift control that reduces reverse torque of the motor generator to the level of a first step, when a pre-stop gearshift order is generated in regenerative braking, between a point of time where the gearshift order is generated and a point of time where the actual gearshift is started;
    a step of mid-gearshift control that reduces the reverse torque of the motor generator to the level of a second step, which is smaller than the level of the first step, from a point of time where the actual gearshift starts to be performed by the gearshift order to a point of time where engaging components of the automatic transmission are completely interlocked; and
    a step of post-gearshift control that increases the reverse torque of the motor generator after the interlocking is finished.

2. The method of controlling a hybrid vehicle as defined in claim 1, wherein the step of pre-gearshift control linearly reduces the reverse torque of the motor generator to the level of the first step, and then maintains the reverse torque of the motor generator that has been reduced to the level of the first step before the step of mid-gearshift control.

3. The method of controlling a hybrid vehicle as defined in claim 2, wherein the step of post-gearshift control relatively gently increases the inclination of increase in the reverse torque of the motor generator in the earlier state, and the relatively steeply increases the inclination after engaging force for engaging components of an automatic transmission is completely created.

4. A method of controlling a hybrid vehicle, comprising:
    a step of engine stop that stops engine when a driver releases an acceleration pedal;
    a step of regenerative braking that makes a brake and a motor generator separately provide desired braking force is performed when the driver presses down a brake pedal after the step of engine stop;

a step of pre-gearshift control that reduces reverse torque of a motor generator to the level of a first step, when a pre-stop gearshift order is generated during the step of regenerative braking;

a step of mid-gearshift control that reduces the reverse torque of the motor generator to the lever of a second step smaller than the level of the first step, after the step of pre-gearshift control;

a step of post-gearshift control that increases the reverse torque of the motor generator after the step of mid-gearshift control.

5. The method of controlling a hybrid vehicle as defined in claim 4, wherein the step of pre-gearshift control is performed until a releasing component of an automatic transmission keeps engaging force even though pressure applied to the releasing component is reduced.

6. The method of controlling a hybrid vehicle as defined in claim 5, wherein the step of mid-gearshift control is performed until the engaging component is completely interlocked of the automatic transmission.

7. The method of controlling a hybrid vehicle as defined in claim 6, wherein the step of pre-gearshift control linearly reduces reverse torque of the motor generator to the level of the first step, and then maintains the reverse torque of the motor generator reduced to the first step before the step of mid-gearshift control.

8. The method of controlling a hybrid vehicle as defined in claim 7, wherein the step of mid-gearshift control linearly reduces the reverse torque of the motor generator from the level of the first step to the level of the second step, and then maintains the reverse torque of the motor generator reduced to the level of the second step before the step of post-gearshift control.

9. The method of controlling a hybrid vehicle as defined in claim 8, wherein the step of post-gearshift control linearly and relatively gradually increases the reverse torque of the motor generator from the level of the second step, and then relatively rapidly increases the reverse torque after engaging force of the engaging components of the automatic transmission is completely created.

* * * * *